(No Model.)  3 Sheets—Sheet 1.
F. DAVISON.
MACHINE FOR MAKING SOLE AND HEEL PLATES.
No. 499,972.  Patented June 20, 1893.
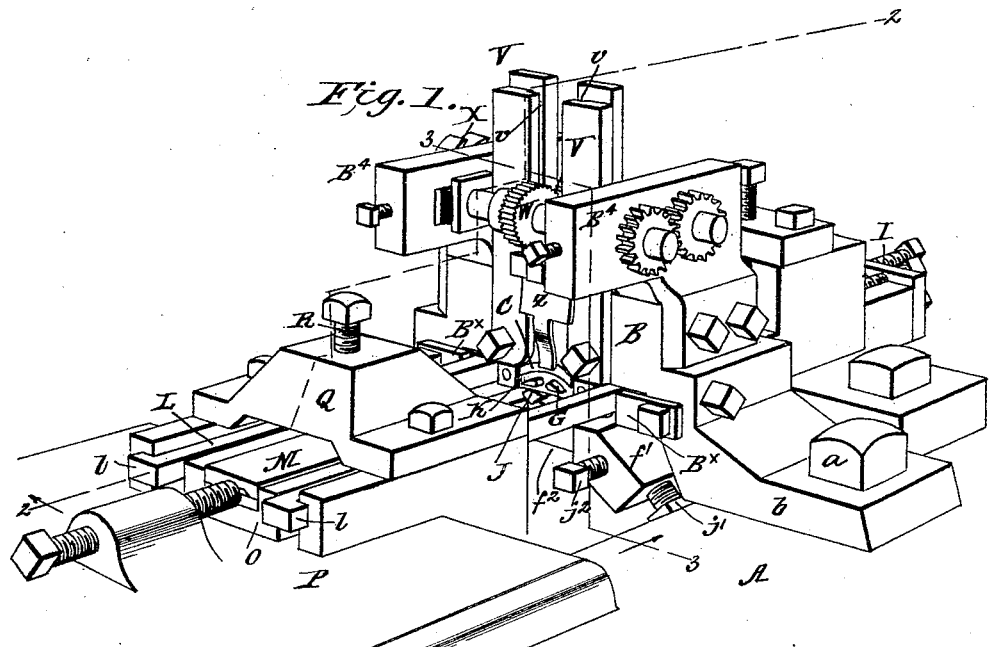
Fig. 1.
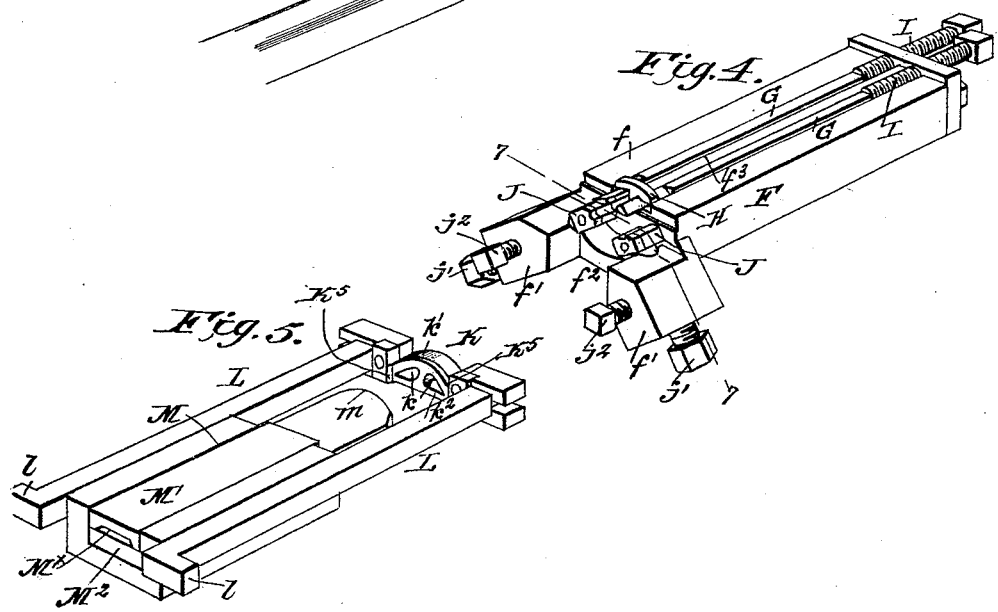
Fig. 4.
Fig. 5.
WITNESSES:
Fred G. Dieterich
M. D. Blondel
INVENTOR
Ferdinand Davison,
BY Mann & Co.
ATTORNEYS.

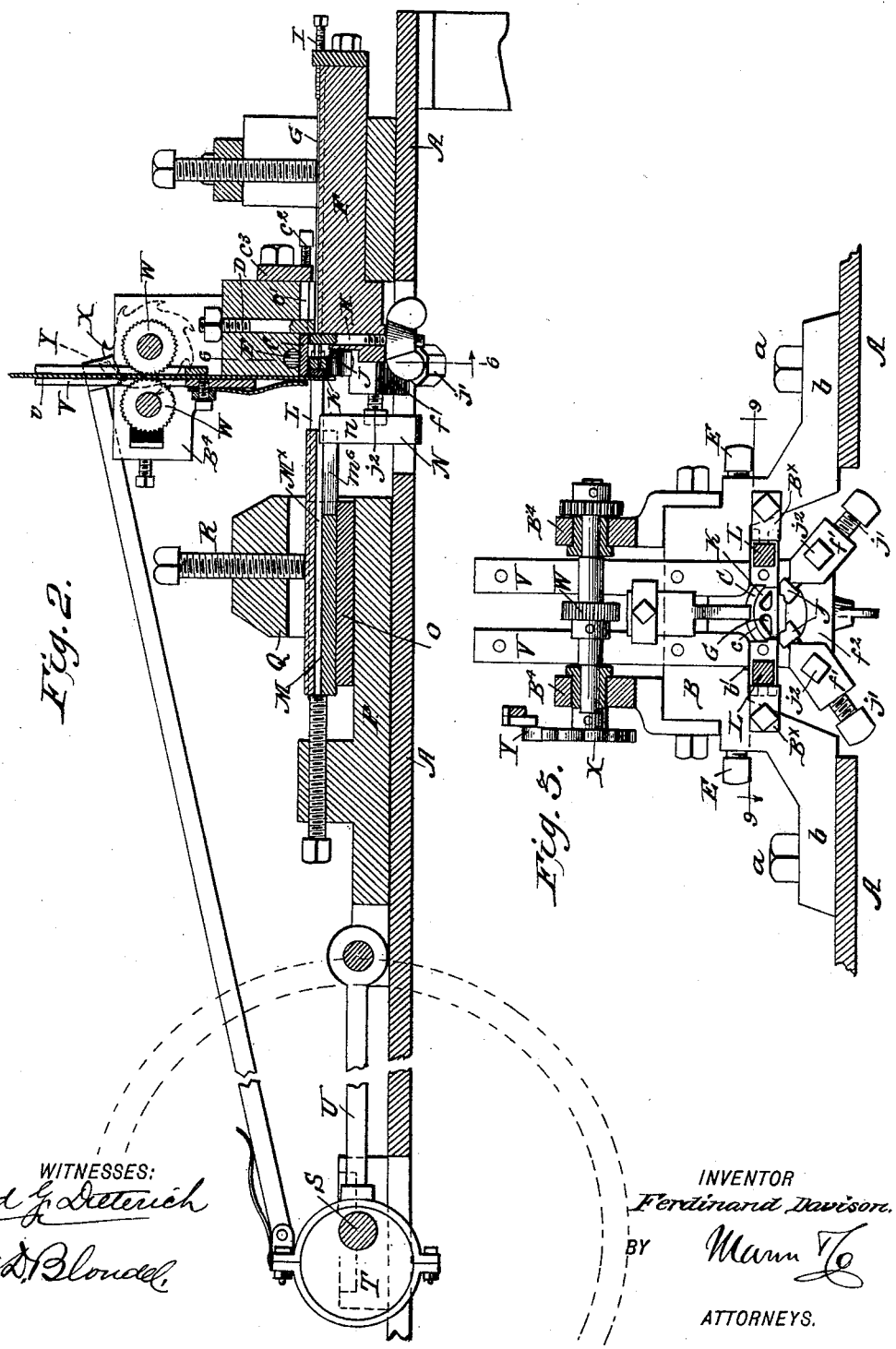

(No Model.) 3 Sheets—Sheet 3.
F. DAVISON.
MACHINE FOR MAKING SOLE AND HEEL PLATES.
No. 499,972. Patented June 20, 1893.
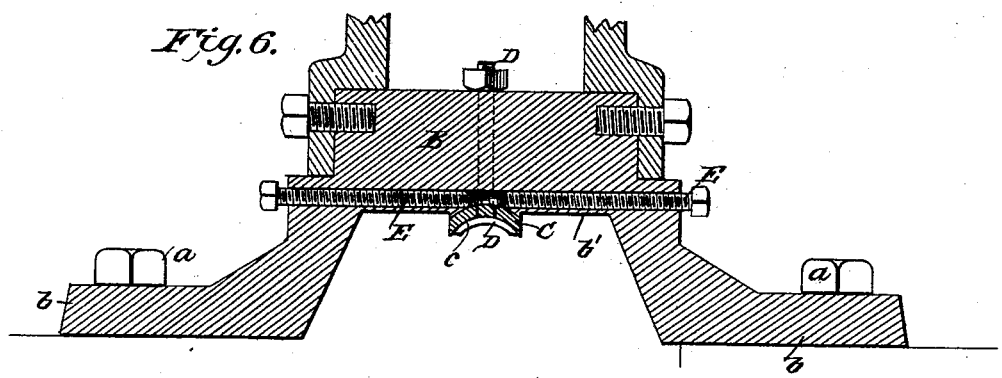
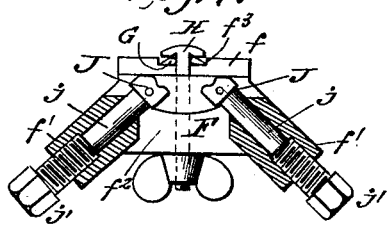
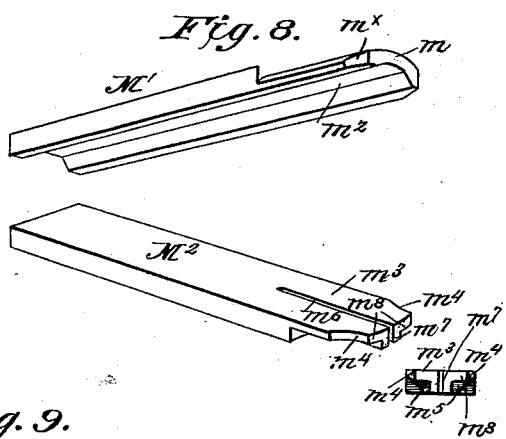
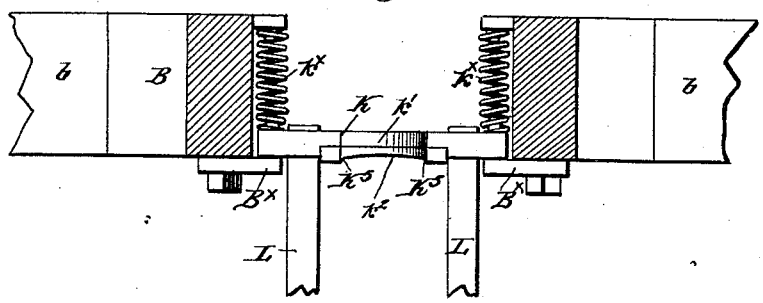
WITNESSES: 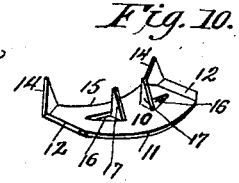 INVENTOR
Fred G. Dieterich Ferdinand Davison.
M. D. Blondel. BY 
ATTORNEYS.

UNITED STATES PATENT OFFICE.

FERDINAND DAVISON, OF RICHMOND, VIRGINIA, ASSIGNOR OF TWO-THIRDS TO ALBERT G. SPRATLEY AND GEORGE J. DAVISON, OF SAME PLACE.

MACHINE FOR MAKING SOLE AND HEEL PLATES.

SPECIFICATION forming part of Letters Patent No. 499,972, dated June 20, 1893.

Application filed January 28, 1893. Serial No. 460,089. (No model.)

*To all whom it may concern:*

Be it known that I, FERDINAND DAVISON, residing at Richmond, in the county of Henrico and State of Virginia, have invented a certain new and Improved Machine for Making Sole and Heel Plates, of which the following is a specification.

My invention relates to a machine for cutting and shaping metallic sole and heel plates from a continuous sheet or band, and it has for its object to provide a machine of this character, which will serve to cut and form such plates at one operation.

It has also for its object to provide a machine of this kind simple in its construction, easily manipulated and effective for its desired purpose.

With other objects in view, and which will hereinafter be referred to my invention consists in the peculiar combination and novel arrangement of parts all of which will hereinafter be described and particularly pointed out in the claims, reference being had to the accompanying drawings in which—

Figure 1 is a perspective view of my machine. Fig. 2 is a vertical longitudinal section of the same on the line 2—2 Fig. 1. Fig. 3 is a transverse section on the line 3—3 Fig. 1. Fig. 4 is a perspective view of the fixed die or head block. Fig. 5 is a similar view of the plunger frame and die. Fig. 6 is a detail vertical section on the line 6—6 Fig. 2. Fig. 7 is a transverse section on the line 7—7 Fig. 4. Fig. 8 is a perspective view of the movable die sections detached. Fig. 9 is a detail transverse section on the line 9—9 Fig. 3, and Fig. 10 is a perspective view of one of the complete plates.

In the practical construction of my machine I employ a suitably arranged frame or table A, on the front end of which is mounted the cutting and shaping mechanism, while at its rear end is located the operating shaft. The cutting and shaping mechanism, the construction of which is most clearly shown in Figs. 2 and 3, comprises an arched like supporting block B, which is fixedly secured to the main frame or table A by the bolts $a$ which pass through the foot portions $b$ of such block. Centrally of the under face $b'$ of the support B, is held what I term the upper cutter plate, which consists of a block C formed with a concaved under face $c$. The outer end of such block is bifurcated as at $c'$, whereby it can be readily slid over the T bolt D, which holds it tightly against its seat on the supporting block B, and such die C is longitudinally adjustable, through the medium of the set screws $c^2 c^2$ which pass through a plate $c^3$ secured to the rear side of the supporting block B, and projected below its under face $b'$ as clearly shown in Fig. 2.

As a simple and effective means for adjusting the front end of the plate C vertically, transverse screws E are held in the supporting block B, which bear upon the upper face of such plate C in the manner most clearly shown in Fig. 6.

F indicates the fixed cutter and shaper head which is rigidly secured to the main frame A, its forward end being disposed under the cross block B; and such end terminates in diverging downwardly extending guide arms $f' f'$ between which a guide way $f^2$ is formed.

In the upper face of the body portion $f$ of the head F, are a pair of parallel ways $f^3$, in which are seated, for longitudinal adjustment the punches G, the forward ends of which are approximately triangular in shape, and project beyond the upper face $f$, and are held secure to their seat by the T-bolt H. The rear end of the punches abut the set screws I I, which serve to adjust the said punches longitudinally.

J J indicate a pair of stationary die plates, which have stud arms $j$ fitting in socket portions in the arms $f' f'$, and such dies are adapted to be vertically adjusted by the set screws $j' j'$ and held to their adjusted positions by the binding screws $j^2 j^2$.

It will be noticed by reference to Fig. 2 that the front end of the punches G G and the die plates J J, are at a point in line with the front edge of the upper cutter plate C. It will also be noticed by reference to such figure, that over the ends of the punches is held a cross head K secured on the ends of a pair of longitudinal guide arms L L the outer ends of which have lateral lugs $l$ $l$ for a purpose presently explained. This cross head which is held for a slight longitudinal movement over the punches, serves the double purpose of an abutting member for the plunger die presently referred to, and for removing the heel plate from off the punches after it has been stamped and cut. For this purpose the cross head K has triangular like apertures $k$ $k$, which fit over the punches G, its upper edge $k'$ being formed to fit and slide under the upper die C, and such cross head is normally held with its abutment face $k^2$ in line with the front edge of the punches G, by the springs $k^x$, it being held from farther forward movement by the stops $B^x$ $B^x$ on the block B as shown.

M indicates the plunger die which is formed in sections $M'$ $M^2$, the upper one $M'$ of which has a convexed upper face, whereby to form a curved cutting edge $m$ which snugly fits under the upper cutter C when the plunger die is forced under the same, in the manner presently described. The lower face of the section $M'$ is hollowed out as at $m^2$ and its ends beveled as at $m^x$. The lower die section $M^2$ has an upper flat face $m^3$, curved notches $m^4$ at its end, undercut portions $m^5$ and a central slot $m^6$ as most clearly shown in Fig. 8.

It should be stated that by forming the plunger die in two sections, it can be much more conveniently and economically constructed than it could, by forming it of one piece.

When the two parts of the die M are held together, a chamber $M^x$ is formed which receives the ends of the punches when the plunger is moved forward, and by forming such plunger sections with undercut portions a central rib like portion $m^7$ which works between the dies J J, and turning members $m^8$ which lap such dies J J, are formed, for a purpose presently referred to.

N indicates a bracket secured to the bed of the machine which has an arm $n$, which projects up through the slot $m^6$ into the chamber $M^x$, such arm serving to free the plunger of any of the completed plates which might hang thereto, on its return movement.

O indicates a carriage held to be reciprocated between the arms L projected from the cross head K and such carriage is secured to a slide platen P, (mounted on the frame A,) by means of a yoke Q, through the top of which passes a screw R, which binds against the die sections and clamps same to the carriage.

In the practical construction of the machine the carriage is held to be reciprocated sufficiently forward to force the cross head against the front end of the fixed head block F, and the yoke frame is so arranged relatively to the arms L, that at the end of its rearward movement it will engage the lugs $l$ $l$, of the said arms and move such arms with it, and thereby positively pull the cross head K back to its normal position and prevent the possibility of the shoe plate hanging to the punches.

Any suitable means may be employed for reciprocating the die carriage, but I prefer to employ the means most clearly shown in Fig. 2, in which S indicates the drive shaft, T an eccentric and U the pitman rods connecting such eccentric and the platen P.

Projected up from the support B are guide arms V, formed with ways $v$ adapted to guide the metal sheet or band, which is fed to the cutting and forming dies by the milled feed rollers W the shafts of which are journaled in horizontal members $B^4$ secured to the support B, which shafts are geared together at one end, while at the opposite end one of such shafts is provided with a toothed wheel X with which is connected a pawl Y which in turn is operated by an eccentric mounted on the drive shaft.

As shown in Fig. 2 the metal blank as it passes down the guide way projects in front of the upper knife and the cross head, its lower end being held tightly against the upper knife and the cross head by a spring finger Z as shown, such spring finger also serving to hold the end of the blank sheet in place after it passes out of its guide-ways.

Before describing the operation of my machine I will first describe the construction of the finished heel or sole plate, referring particularly to Fig. 10 which illustrates one of such plates. It will be noticed the body 10 of the plate, has a curved front end 11 and straight sides partially turned up as at 12, which sides terminate at their inner end in pointed prongs 14 at the ends of the inner curved edge 15. The body 10 has triangular slots 16, the bases of which terminate in pointed prongs 17.

The manner in which my machine operates is as follows: The sheet metal blank being in place as shown in Fig. 2, is snugly held against the upper cutter C and the punches G. Now, as the plunger M moves forward, and presses the blank against the punches G, the upper convex front edge of upper die cuts the curved edge 11 of the plate by forcing it under the edge of the upper cutter; and as such blank is pressed against the punches, such punches will press inward the prongs 17, a complete triangular cut in such blank being avoided, in that, the ends of the punches incline inward, from the point to the base, and the displaced metal being forced into the space $M^x$ in the die M. During this operation, the lower corners of the blank are engaged by the lateral members $m^7$, and crowded against the dies J J, whereby such ends are turned up to form the prongs 14.

In some cases it is preferable to have the shoe plate slightly dish shaped, to make it adhere more firmly to the sole, and for such purpose the outer face of the die M is slightly convex, and the cross head contact face slightly concave, its edge having offsets $K^5$ $K^5$, whereby the edges of the plate 10 are crowded over the beveled front edges of the die M to form the bent edge 15. After the plunger M has moved forward its full stroke and recedes, the springs $K^\times K^\times$ will force the cross head outward and cause it to move the finished plate 10 off from the punches, when it drops down between the arms $f' f'$. Should however the plate bind on such punches, it will be forced off as the cross head is moved forward through the medium of the reciprocating carriage. In case the plate 10 should hang to the front of the die M it will be forced off by the stationary arm $n$.

From the foregoing description taken in connection with the drawings it will readily be seen that by securing the punches in the manner described they can be adjusted longitudinally outward as their ends become worn, the lower dies J being also adjustable for such purpose.

By constructing the upper cutter in the manner shown it can be quickly adjusted longitudinally, and also vertically as it becomes worn, and its cutting edge can be easily sharpened by filing the face or end straight across, the cutting edges of the movable die being also sharpened by filing the face across.

Having thus described my invention, what I claim as new, and desire to secure by Letters Patent, is—

1. A machine for the purpose described comprising a fixed cutter, a fixed head block, having prong forming dies, a reciprocating plunger die having a cutting edge opposing the fixed cutter, and lateral extending portions adapted to lap the fixed forming dies, substantially as and for the purposes described.

2. In a machine as described, in combination, a fixed cutter, a stationary head having projecting punches G and fixed dies J arranged substantially as shown, a cross head movable on such punches G and a movable plunger having a cutting member adapted to oppose the fixed cutter and portions adapted to lap the dies J all substantially as and for the purpose described.

3. In combination, a blank feed mechanism, the fixed upper cutter C, the head block F, punches projected longitudinally therefrom, the dies J projected toward such punches, a reciprocating platen, the plunger die secured thereto, said die having a cutting member adapted to slide under the upper cutter, and lateral members adapted to pass over the fixed dies, the drive shaft and operating connections between the blank feed mechanism and the operating shaft all substantially as shown and described.

4. In combination with the fixed cross head, the lower dies J J secured thereto and the movable die M having a cutting member at its upper end, and portions $m^7$ at its lower end adapted to lap the dies J, and the feed devices, of the upper cutter C, longitudinally adjustable substantially as and for the purpose described.

5. In combination with the fixed head block F F, the lower dies J J secured thereto the movable die M arranged substantially as shown, of the supporting block B, the cutter C adapted to be fixedly held thereon, and held for vertical and longitudinal adjustment, as and for the purpose set forth.

6. In combination with the fixed head blocks F F, the lower dies J J, secured thereto and the movable die M, arranged substantially as shown, of the supporting block B, the cutter C, means for holding it to its seat on the block B and the adjusting bolts E, adapted to bear against the upper face of such cutter C substantially as and for the purpose described.

7. In combination with the upper fixed cutter, the fixed head block F and projecting punches G, of the plunger die M having a cutting portion at its upper end and a socket portion $M^\times$ to receive the punches G, of the cross head fitted to slide on the punches G and means for normally holding such head to its outermost position, substantially as shown and described.

8. In combination with the fixed cutter C, the movable die M having an upper cutting edge adapted to slide under the cutter C, and a recess $M^\times$, of the fixed head block F and the punches G projected from such block and means for adjusting such punches longitudinally substantially as and for the purpose described.

9. In combination with the fixed support B the cutter C and the plunger die M having an upper cutting portion and a recess $M^\times$ and flanges $m^7$, of the head block F having longitudinally projecting adjustable punches G and vertically adjustable dies J all arranged substantially as shown and described.

10. The combination with the supporting block, the upper cutter, the head block and punches and the movable die, of the clamp finger Z secured to the supporting block adapted to hold the blank against the upper cutter, substantially as and for the purpose described.

11. The combination with the fixed head block F, the punches G G and the fixed cutter C, the movable platen and the movable die held thereon, of the cross head K fitting on the punches G, and having rearwardly extending arms L L having offsets $l\ l$, adapted to be engaged by the moving platen and arranged substantially in the manner and for the purpose described.

12. In a machine substantially as described, the movable die M formed of an upper and lower section M' and $M^2$, the section M' having a cutting edge $m$ at its upper end, and the section $M^2$ a central rib and lateral cut out portions substantially as and for the purpose described.

13. In a machine as described the movable die M formed of detachable sections M' M² the section M' having a cutting edge *m* at its top, and formed with a concaved under face, the section M² having a central depending rib
5 and laterally extended portions $m^7$ all substantially as and for the purpose described.

14. In a machine as described the combination with the main frame and the reciprocating die M said die having a longitudinal slot on its lower face, of the guide finger N, 10 secured to the frame and projected up into the said slot substantially in the manner and for the purpose shown and described.

FERDINAND DAVISON.

Witnesses:
 LEROY D. GRANT,
 C. H. SUTTON.